United States Patent [19]

Root et al.

[11] Patent Number: 5,369,587
[45] Date of Patent: Nov. 29, 1994

[54] COMPUTER CONTROLLED RAILWAY BRAKE EQUIPMENT

[75] Inventors: Kevin B. Root, Black River; John J. Allen, Jr., Watertown; Ronald O. Newton, Adams, all of N.Y.

[73] Assignee: Knorr Brake Holding Corp., Westminster, Md.

[21] Appl. No.: 196,901

[22] Filed: Feb. 7, 1994

Related U.S. Application Data

[63] Continuation of Ser. No. 984,100, Dec. 1, 1992, abandoned, which is a continuation of Ser. No. 447,816, Dec. 8, 1989, Pat. No. 5,172,316.

[51] Int. Cl.$^5$ .................................................. B60T 13/68
[52] U.S. Cl. ........................... 364/426.01; 246/182 B; 303/3; 303/15; 303/20
[58] Field of Search ............... 364/426.01, 426.02; 303/3, 15, 16, 20, 33, 70, 80–82, 22 R, DIG. 3; 246/182 B, 182 R

[56] References Cited

U.S. PATENT DOCUMENTS

| | | | |
|---|---|---|---|
| 3,380,399 | 4/1968 | Southard et al. | 246/182 R |
| 3,519,805 | 7/1970 | Throne-Booth | 246/182 B |
| 3,910,639 | 10/1975 | Engle | 303/15 |
| 4,005,838 | 2/1977 | Grundy | 246/187 B |
| 4,042,810 | 8/1977 | Mosier | 105/61 |
| 4,052,109 | 10/1977 | Nacase et al. | 303/3 |
| 4,107,253 | 8/1978 | Borg et al. | 246/182 B |
| 4,181,369 | 1/1980 | Balukin et al. | 303/16 |
| 4,316,640 | 2/1982 | Cripe | 303/15 |
| 4,344,138 | 8/1982 | Frasier | 303/20 |
| 4,347,569 | 8/1982 | Allen, Jr. et al. | 364/426.02 |
| 4,402,047 | 8/1983 | Newton et al. | 303/3 |
| 4,534,599 | 8/1985 | Wright et al. | 303/22 R |
| 4,553,723 | 11/1985 | Nichols et al. | 246/182 R |
| 4,555,766 | 11/1985 | Wright | 303/95 |
| 4,582,280 | 4/1986 | Nichols et al. | 246/182 R |
| 4,598,953 | 7/1986 | Wood et al. | 303/15 |
| 4,652,057 | 3/1987 | Engle et al. | 303/3 |
| 4,830,437 | 5/1989 | Rumsey | 303/15 |
| 4,854,648 | 8/1989 | Nakao | 303/81 |
| 4,859,000 | 8/1989 | Deno et al. | 303/33 |
| 4,904,027 | 2/1990 | Skantar et al. | 303/15 |
| 5,104,203 | 4/1992 | Ferri | 303/15 |
| 5,192,118 | 3/1993 | Balukin et al. | 303/15 |
| 5,222,788 | 6/1993 | Dimsa et al. | 303/15 |

*Primary Examiner*—Gary Chin
*Attorney, Agent, or Firm*—Barnes & Thornburg

[57] ABSTRACT

A computerized locomotive control system receiving as inputs electrical signals representing automatic and independent braking control signals and a computer for determining, from said input signals, electrical signals representing desired equalization reservoir pressure, desired independent application and release pressure and desired actuating pressure. Electro-pneumatic valves controls the pressure in the equalization reservoir, on the independent application and release pipe and as the actuating pipe in response to the desired pressure signals. A electro-pneumatic valve for the control reservoir of the locomotive brake is controlled by the computer in response to pipe pressures. The computer provides penalties and interlocks electrically.

4 Claims, 14 Drawing Sheets

COMPUTER CONTROLLED RAILWAY BRAKE EQUIPMENT

This is a continuation of application Ser. No. 07/984,100, filed Dec. 1, 1992 which is a continuation of application Ser. No. 07/447,816, filed Dec. 8, 1989, now U.S. Pat. No. 5,172,316 issued Dec. 15, 1992.

BACKGROUND AND SUMMARY OF THE INVENTION

This invention relates generally to novel and improved brake equipment for rail vehicles and more particularly to computer controlled brake equipment located on the locomotive and arranged to control the application and release of the brakes of such locomotive, any trailing locomotive, and any cars coupled to either.

Prior art brake equipment for locomotives has typically been implemented with mechanical and pneumatic hardware, as, for example, the 26-L brake equipment of New York Air Brake Company of Watertown, N.Y. As illustrated in FIG. 1, this prior art brake equipment employs as major components a 26-C brake valve 30 including an independent brake valve SA-26, a 26-F control valve 33 and a J relay valve 37 interconnected with various pneumatic pipes represented by solid lines. The brake valve 30 responds to movement by the train operator of an automatic brake handle 31 to regulate pressure in a brake pipe 40 by means of an equalization reservoir 36 and a brake pipe relay in the brake valve 30 for application and release of brakes on the locomotive, the brakes of any trailing locomotive and the brakes of cars coupled to either (train brakes).

The automatic brake handle has six positions as illustrated by the sector diagram in FIG. 2 and defined as follows:

a) The Release position is for charging the brake equipment and releasing the train brakes.

b) In the Minimum Reduction position, brake pipe pressure is reduced a minimum amount so as to initiate quick service on the train brakes (typically 4-6 psi brake pipe reduction), and lightly apply the train brakes.

c) The sector or zone between the Minimum Reduction and Full Service positions is the service zone. As the automatic brake valve handle is moved through this zone from Minimum Reduction toward Full Service, brake pipe pressure is reduced proportionally to 23-26 psi with the handle at the Full Service position, a full service brake application is obtained.

d) In addition to providing full service brake application as with the brake valve handle in the Full Service position, Suppression of overspeed control and safety control application is obtained in the suppression position.

e) The handle is movable to the Handle Off position as for trailing units of a multiple unit locomotive or for locomotive's being towed "dead" in a train. The handle off position is also used for "overreductions" allowing brake pipe to be reduced further than attainable in the Full Service position. Thus assuring full train brake applications.

f) The Emergency position is used for making brake valve emergency brake applications and results in brake pipe exhaust and brake pipe venting at the highest rate of reduction.

The brake valve 30 also responds to movement of an independent brake handle 32 by the train operator to control the application and release of the locomotive brakes independently of the train brakes and for releasing an automatic brake application of the locomotive independently of the train brakes by way of the 26-F control valve 33 and the J relay 37.

The independent brake handle 32 has two extreme positions, Release and Full Application separated by an application zone as shown in FIG. 2. As the handle is moved from the Release position through the application zone toward the Full Application position will apply the locomotive brakes. The independent handle 32 can be depressed so as to cause the release of any automatic brake application existing on the locomotive (due to operation of the automatic brake handle 31). This is effected via the 26LC brake valve 30 and the 26-F control valve 33. If the independent brake handle 32 is in an Application position, the locomotive brake will be applied according to the higher of independent or automatic brake.

The 26-F control valve 32 and auxiliary reservoir 36 respond to service and emergency rates of brake pipe pressure reduction (brake applications) to control the locomotive brake cylinder pressure via the J relay valve 37. The 26-F control valve 33 also responds to a brake release operation of the independent brake handle 32 to control locomotive brake cylinder pressure to release the locomotive brakes following an automatic brake operation at the service rate developed by operation of the automatic brake handle 31. A key element of the 26-F control valve 30 is a double check valve 34 which applies to the J relay valve 37 the higher of the pressures developed by the 26-F control valve 33 or by the independent application and release pipe 42.

The J relay valve 37 is a volume amplifier that operates to translate the pressure at a smaller volume input to a desired pressure at a larger volume output. As the desired output pressure can differ for different locomotive (different sized brake cylinders), it has been necessary to select a particular J relay valve for a particular locomotive specification.

The P2-A valve 35 is a brake application or penalty valve responsive to unsafe conditions to effect brake application at the full service rate. For instance, the P2-A valve is illustrated as responding to an overspeed condition and/or to a foot pedal fault (absence of foot pressure on the foot pedal).

The brake equipment also includes a multiple unit valve 38 enabling the locomotive to be united with other locomotives as either a lead, trail or dead unit. The multiple unit valve 38 of a lead unit serves to signal trail units via independent brake application and release pipe 42 and an actuating pipe 43. In the lead position, multiple unit valve 38 connects the actuating pipe signal from brake valve 30 to the control valve 33 and actuating pipe 43 and connects the independent application and release signal from the brake valve 30 to the independent application and release pipe 42.

The prior art brake equipment is costly to manufacture as it requires substantial iron and aluminum castings for each of the pneumatic valves and is costly to install as it requires numerous pipe interconnections.

Computerized brakes are well known as shown by U.S. Pat. No. 4,402,047 to Newton et al. In this computerized brake control system, the computer calculates the desired brake cylinder pressure from commanded brake signals, vehicle weight, vehicle speed and dynamic braking and compares the desired brake cylinder pressure with the actual brake cylinder pressure. Then it controls the fluid brake system to cause the actual brake pressure to be substantially equal to the desired brake pressure. As illustrated in FIG. 2 of that patent, the brake control manifold 40 has an electromagnetically controlled apply valve 46 and release valve 48 under the control of computer to cause the desired brake cylinder pressure to match the desired brake cylinder pressure.

Another system which shows the use of magnetic valves for applying and releasing brake pressure is U.S. Pat. No. 4,652,057 to Engle, et al. Single control handle 76 is used in combination with a control panel 102 and a display 96. In both systems, the electromagnetically controlled valves control the specific pressure applied to the brake cylinders from a reservoir and does not control the pressure within the reservoir.

Prior systems have also included a substantial amount of fluid tubing which is costly to build and maintain. Similarly the interlocks between the propulsion and braking system have been mechanical and also a function of the operator.

Thus this is an object to present invention to provide a novel computer interfaced for a computer controlled rail brake equipment.

Another object of the present invention is to provide a braking system which will guarantee full service application for any initial computer brake pipe pressure charge. A further object is to provide standardization of locomotive hardware that would not require alternate parts.

Still a further object of the present invention is to provide a computer controlled railway brake system with improved interlocks.

These and other objects of the present invention are achieved by providing a computerized locomotive control system receiving as inputs electrical signals representing automatic and independent braking control signals and a computer for determining, from said input signals, electrical signals representing desired equalization reservoir pressure, desired independent application and release pressure and desired actuating pressure. A first electro-pneumatic valve controls the pressure in the equalization reservoir in response to the desired equalization pressure. A second electro-pneumatic valve controls the pressure on the independent application and release pipe in response to the desired independent application release pipe pressure signal. A third electro-pneumatic valve controls the pressure on the actuating pipe in response to the desired actuating pressure signal. Thus the system has basically used a computer to emulate the 26C brake valve usable with automatic and standard independent brake handles.

Input signals are provided representing predetermined equalizing reservoir release pressure. The computer determines a corresponding full service pressure from the predetermined equalizing reservoir release pressure and determines a proportional desired equalizing reservoir signal in the range between the equalizing reservoir's predetermined release and corresponding full service pressures from the automatic braking control signals. Thus the braking signal is proportional to the predetermined reservoir release pressure and not dependent merely on the brake handle position. This improves train brake handling by making the Full Service brake position actual full train brake application.

The system also includes a fourth electro-pneumatic valve for controlling the pressure in the control reservoir. The computer determines the desired control reservoir pressure from pipe pressures alone or in combination with braking control signals to control the fourth electro-pneumatic valve. Electric signals representing brake pipe pressure, the independent application and release pipe pressure and the actuating pipe pressure are provided to computer.

The computer also receives electrical signals identifying the brake cylinder valve and uses this in determining the appropriate reservoir pressure. This allows the combination for J relays of various capacities. The locomotive brake cylinder circuit also includes pneumatic circuit for pneumatically controlling the brake cylinder by applying and releasing emergency pressure independent of the control reservoir as well to limit the brake cylinder pressure. A fluid switchover circuit is also provided determining whether the fourth electro-pneumatic valve or the brake pipe will control pressure in the control reservoir. A brake pipe disconnect valve is also provided in responsive to the switchover to disconnect the brake pipe valve from the brake pipe.

The computer also receives electrical signals representing a penalty condition and determines a service brake application pressure as the desired equalization reservoir pressure in response to a penalty condition. Additionally an electromagnetic cut-off valve is provided and controlled by the computer in response to an emergency brake application to cut-off the brake pipe from the brake pipe valve. If the train is in the trailing mode, the computer also disconnects the brake pipe valve from the brake pipe using the cut-off control.

As safeguards, the computer determines, for absence of an automatic braking control signal, a service reduction of a desired equalizing reservoir pressure signal to at least the full service application. The computer also determines, for absence of an independent brake control signal, a brake release desired independent release pressure signal. The first electro-pneumatic valve reduces the pressure in equalizing reservoir to at least full-service for absence of a desired equalization reservoir pressure. Second and third electro-pneumatic valves lap for absence of a desired independent application and release pressure signal and actuating signal respectively.

The computer also provides a plurality of electrical interlocks depending upon the position of the handles as well as ignoring the position of the handles. Upon determination of an emergency braking condition, the computer transmits an idle condition signal for the throttle and will not transmit any propulsion signals until the throttle handle is also placed in the idle position. The computer also delays the transmission of predetermined signals from the throttle when switching between propulsion and dynamic braking. Also, the computer, when the throttle handle switches from forward to reverse, prevents transmitting propulsion control signals until the locomotive speed in below a predetermined speed. If the computer senses that the locomotive is being switched between the leading and trailing modes, it does not transmit any control signals until the position control signals represent neutral or idle positions for the automatic and interdependent brake controls and the throttle. Also in switching between leading and trailing modes, the locomotive speed must be zero.

As with the braking signal, the computer can determine a proportional propulsion signal between zero and an inputted maximum speed for the appropriate throttle position. If the system is set for the trailing mode, the computer does not produce any propulsion or dynamic braking signals. The computer can also be programmed to produce automatic speed control.

Other objects, advantages and novel features of the present invention will become apparent from the following detailed description of the invention when considered in conjunction with the accompanying drawings.

DETAILED DESCRIPTION OF THE DRAWINGS

Figure 1:
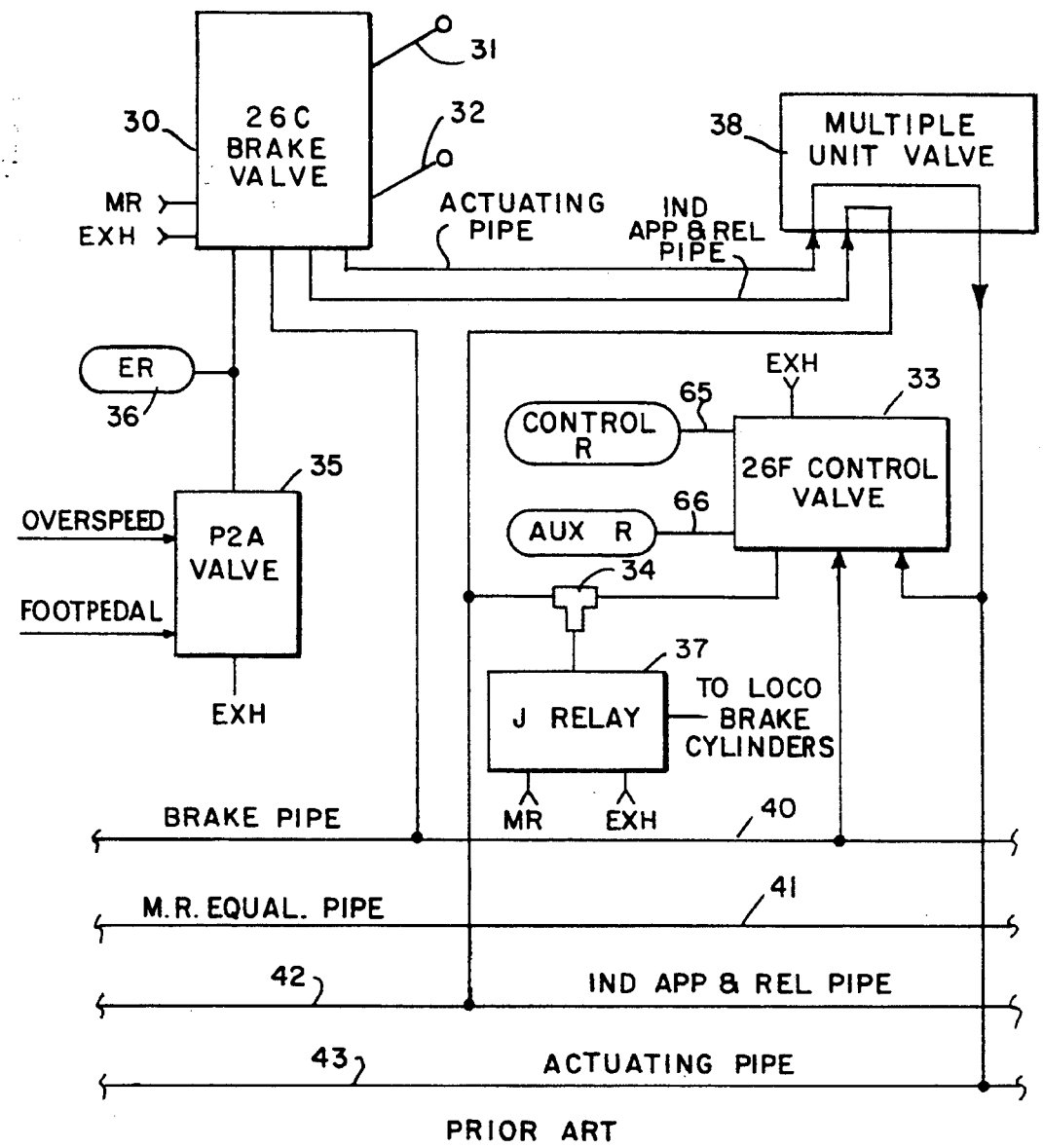
FIG. 1 is a block diagram of a pneumatic brake system of the prior art.
Figure 2:
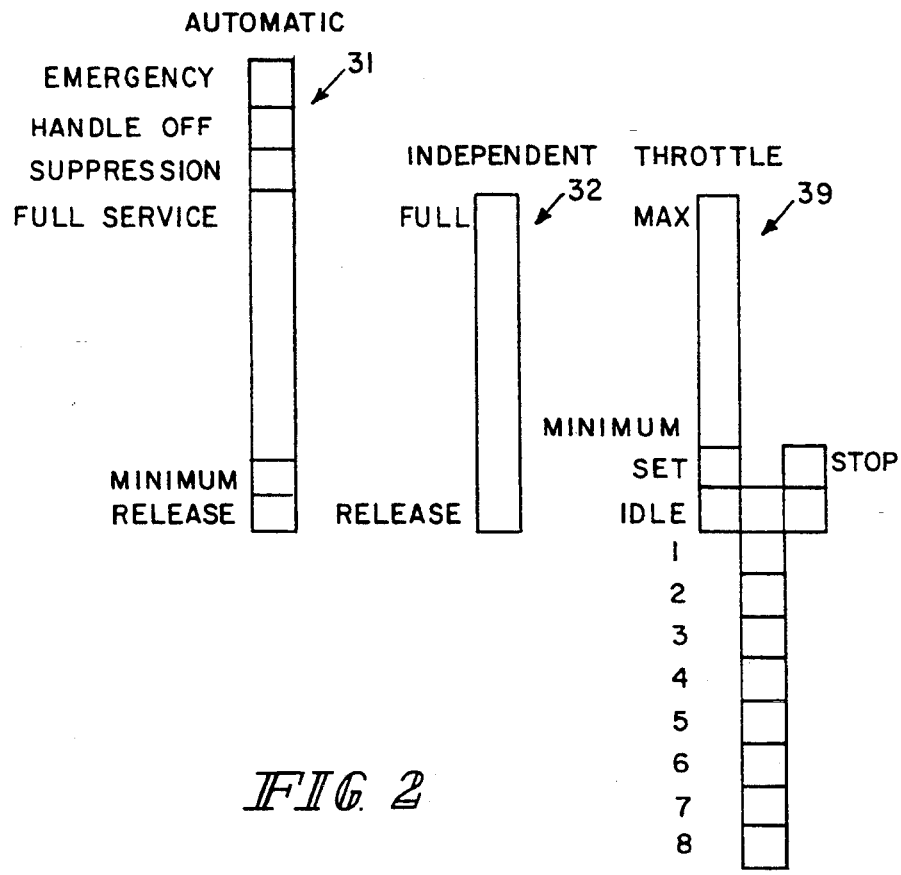
FIG. 2 is a schematic representation of the control handles of the master control stand including the automatic braking, independent braking and the throttle handles.
Figure 3:
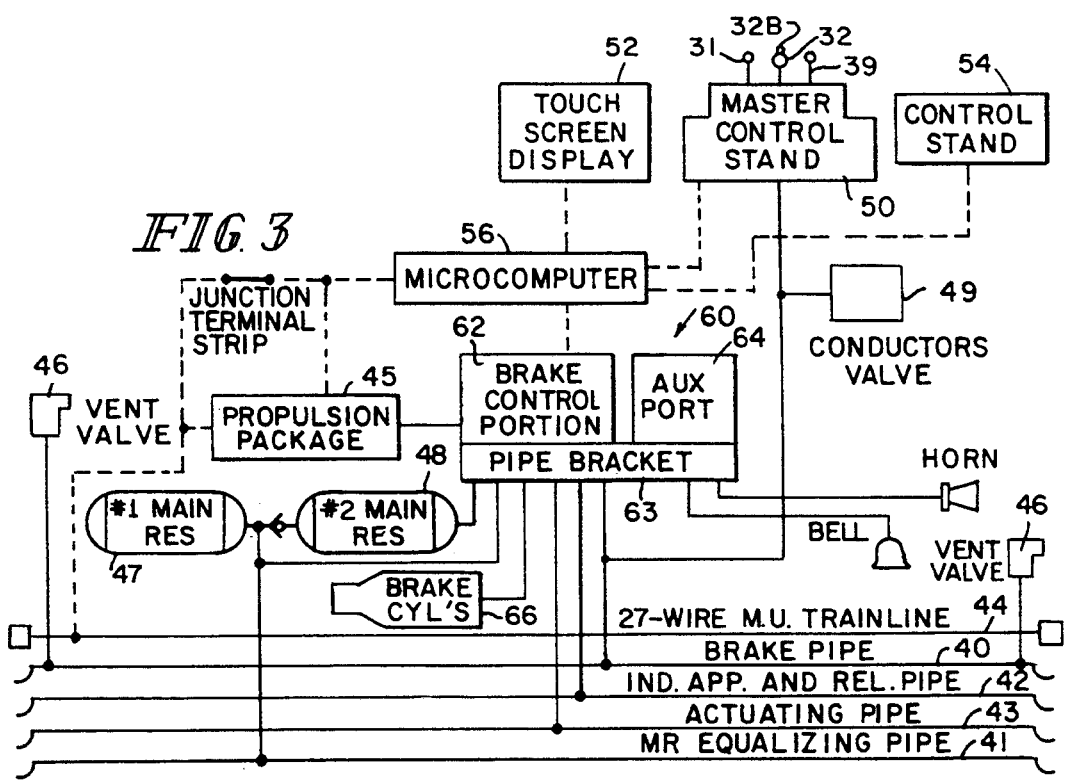
FIG. 3 is a schematic representation of a locomotive control system incorporating the principles of the present invention.

A computerized locomotive control system of the present invention is illustrated in FIG. 3. It should be noted that in the Figures the fluid lines of the pneumatic system will be illustrated by solid lines whereas the electrical interconnections will be illustrated by dash lines. Wherever possible the elements, for example the trainlines and the control handles, in the Figures will have the same numbers as those of the prior art described in FIGS. 1 and 2. A master control stand 50 includes the automatic brake handle 31, the independent brake handle 32 and the throttle 39. The locomotive includes the brake pipe 40, the master reservoir equalization pipe 41, the independent application and release pipe 42, actuating pipe 43, and a 27-wire multiple unit electrical trainline 44. The standard pair of venting valves 46 are provided on the brake pipe 42.

The master control stand 50 is fluidly connected to the brake pipe 40 so as to directly apply an emergency condition fluidly to the brake pipe. A conductor valve 49 is also connected to the brake pipe 40 to apply an emergency condition. The master control stand 50 is electrically connected to the microcomputer 56 as are touch screen display 52 and an auxiliary control stand 54. Microcomputer 56 is connected to the propulsion package 45, which is a standard prior art propulsion package, and both are connected to the 27-wire trainline 44 for electrically communicating with the other locomotives on the train.

An electro-pneumatic interface control valve 60 between the microcomputer 56 and the pneumatic braking system is shown as including the brake control portion 62 and an auxiliary portion 64 both connected to pipe bracket 63. Interface control valve 60 provides all the functions of the control of the brakes, both pneumatically and electrical signalling, and for auxiliary controls. The pipe bracket 63 is a connection of all pipe interfaces which provides a unitized valve for simplification of maintenance. The pipe bracket has the required reservoir for brake operations and contains disposable filters for the pneumatic inputs. The brake control portions 62 provides for all braking portions found on the locomotive. This controls the brake pipe 40, the brake cylinder of the locomotive 66, independent brake pipe 42 and actuating pipe 43. It provides all the required electrical interfaces for the operation of the brake system. The auxiliary portion 64 provides pneumatic controls for the special functions. This may be for the sanding, pneumatic horns, bells etc. . . Auxiliary portion 64 operates independent of the brake valve. A first main reservoir 47 is connected to the main reservoir equalization pipe 41 as is a second main reservoir 48. The second main reservoir 48 is connected to the electro-pneumatic interface control valve 60.

The system of FIG. 3 is a simplification of the controls by consolidating the numerous engineer control devices in a central location. Controls have been consolidated into a three handle master controller unit 50 and a touch screen display 52. All of the normal train operation will be obtainable through these two devices. A fuel pump, engine run, headlights, auxiliary lights and heater controls are not incorporated into the microcomputer 56 since they would not simplify the operation. These functions are in the auxiliary control stand 54.

The pneumatic brake control devices that had to be of a mechanical nature is simply accomplished by a computer logic. The resulting reduction of pneumatic control devices, allows the consolidation of brake control into a unitized package. Required periodic brake overall can now be accomplished through the removal and rebuilding of a single valve package. The maintenance will also be simplified by diagnostic capabilities under computer control. Faults can be pinpointed and displayed to the maintenance personnel.

Other than the single pneumatic control between the master control stand 50 and the brake pipe 40 to provide an emergency brake application directly to the brake pipe 40, the master control stand 50 is connected to the pneumatic part of the brake system through the microcomputer 56. All handles are independent of each other and their is no mechanical interlock between the handles. The interlock is electrically provided by the microcomputer 56 thereby simplifying the master control stand 50. In the trail mode or cutout positions, the handles 31, 32 and 39 are free to be moved and will produce no action through a computer lockout. The only action is the emergency brake application produced pneumatically. The computer 56 is still responsive to the 27-wire trainline 44 and the pipes to provide appropriate controls even in the trail mode.

The automatic brake handle 31 provides an analog signal to the microcomputer 56 to the level of command brake or special commands as shown in FIG. 2. The Release position provides maximum level of the analog signal to the microcomputer 56 to charge the brake pipe fully or automatically release the brakes. The Minimum brake application position provides a linear decrease in its analog output signal proportional to the extremes between release and emergency positions. This signals the microcomputer 56 to reduce the brake pipe pressures sufficient to initiate quick service and set the brakes on the cars. This is generally a 4 to 6 psi brake pipe reduction. The Full Service brake application position provides a further decrease in its analog signal. movement of the handle 31 from the Minimum position signals the computer to further reduce the brake pipe 40 proportional to the handle position up to the Full Service or maximum service brake position.

The microcomputer 56 controls the brake pipe 40 in such a manner that the Full Service position is the maximum service brake available for the initial brake pipe setting. As will be discussed more fully below, the computer has the capability of proportioning the brake pipe signals as a function of release minimum service to a full service application based on the initial brake pipe setting. This overcomes a substantial number of the problems of the prior as discussed above.

A Suppression position is provided on a standard automatic handle 31 and may be ignored by the computer logic. It is only provided for the engineers convenience. The purpose of the Suppression position is to indicate that the handle is in Full Service to the overspeed and/or safety control logic, therefore the Full Service position is sufficient for this purpose. The Handle Off position is also not required but may be used to signal to the microcomputer 56 to reduce the brake pipe pressure to zero. The Emergency position has the least analog output and signals the microcomputer 56 that an emergency reduction of the brake pipe is required. This position mechanically sends the brake pipe directly to atmosphere and results in an emergency application regardless of state of the computer or cut-off device to be described later.

Although the movement of automatic brake handle from Full Service towards Release may increase analog signal, microcomputer 56 will not react. Brake pipe charge or brake release command may only be achieved in the Release position. If preferred, the logic can be changed to allow gradual brake release for passenger service operation. Failure of the automatic brake handle 31 or loss of the analog signal will result in a null output from the master control stand 50. The microcomputer 56 will interpret this as a reduction of the brake pipe to zero at a service rate. This is the same command as the Handle Off position.

The independent brake handle 32, which provides independent control over the locomotive brake versus the train brake of the automatic brake handle 31, also provides an analog output signal to the microcomputer 56 proportional to handling extreme positions. Unlike the automatic brake handle 31, loss of an analog signal from the independent brake handle 32 results in releasing the locomotive brake and does not result in a brake application as in the independent brake handle failure. Thus the engineer has the option of completing the run or moving to a sidetrack from the leading cab. Independent brake handle 32 moves between the Release position as a minimum analog output signal to the Full position which has the maximum analog output signal. This movement will result in a fully variable analog output signal in either direction and a fully variable increase and decrease of pressure in the independent application and release pipe 42 under the command of the computer 56.

A modification of the independent brake handle 32 is illustrated in FIG. 3 as having a button 32b which actuates a momentary switch. The pressing of button 32b is a command to pressurize the actuating pipe 43. Release of the button will vent the actuating pipe 43. This provides the "bail-off" feature of the automatic brake and if the button is continuously depressed, "bailoff" of an emergency brake. This is to be distinguished from the prior art wherein the independent brake handle 32 itself had to be physically depressed to effectuate this function mechanically and pneumatically.

The throttle 39 is a control for the 27-wire trainline 44 for power and dynamic braking. Detail of the microcomputer interface with the 27-wire trainline 44 will be discussed later with respect to FIGS. 8 and 9 and only summarized here.

FIG. 2 also illustrates the third master control stand handle 39 which is the throttle. As shown in FIG. 2, the throttle 39 includes the standard 1 to 8 propulsion positions as well as the dynamic braking which goes from a set position to a maximum. Between the propulsion and the dynamic braking portion is the Idle position and a Stop Engine off position. The throttle lever 39 provides an analog output signal proportional to handle position with the maximum output representing maximum power. The microcomputer 56 reads the propulsion detents 1-8 and provides appropriate signals on the 27-wire trainline 44. It also monitors the Idle, Set and Dynamic braking positions. In the Stop position, a shutdown of the engines is provided as a digital signal that circumvents the microcomputer 56. Whereas the automatic brake handle 31 and Independent brake handle 32 are of standard configurations, the throttle 39 is a new and distinctive control handle.

Figure 4:
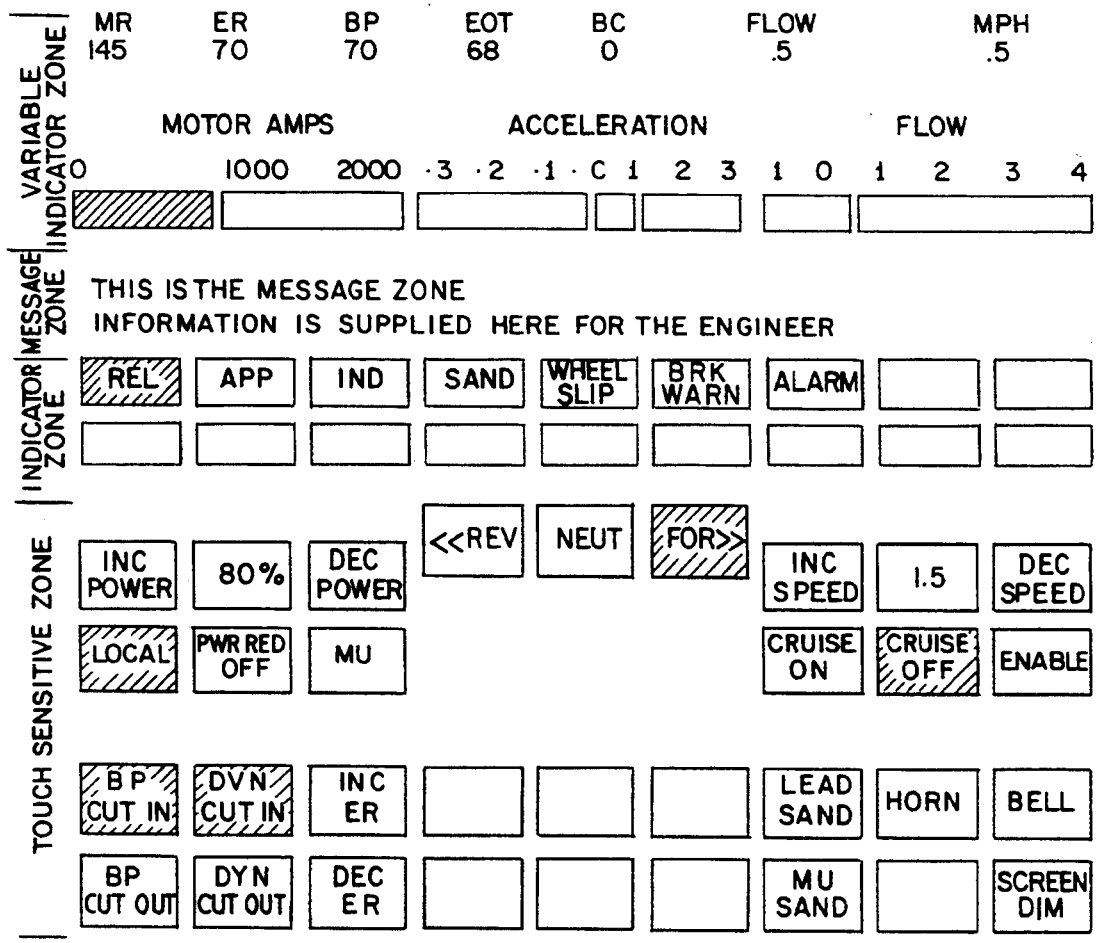
FIG. 4 is a view of the touch screen display according to the present invention.

The touch screen display 52, as illustrated in FIG. 4 has three basic functions. It provides an indication of all of the status of the train controls, it provides switching functions by the touching of the screen, and it provides special messages to the engineer. With locomotive in the cut-out or trail mode, the screen is blank. Activation or cut-in of the locomotive brings up the control screen display.

The touch screen display 52 has four distinct zones. The lower zone is for the touch sensitive control switches including eighteen switches. There may be either momentary or latching switches according to software control. When activated the selected function will be shaded or filled in. The touch zone also has Reverser, Power Reduction and Cruise functions located on the top of the zone. The digital indicator zone provides indications normally accomplished by lamps. There are eighteen possible indications given by shading or filing of blocks. The message zone is an information zone provided to the engineer by the microcomputer 56. These may be for informational purpose only or operation instruction or fault occurrences. The variable indicator zone provides an indication that would normally be displayed by gauges. Amperage, flow and acceleration are shown as bar graphs.

The display is used as a prompt to instruct the operator. For example when the master control stand 50 is keyed in, and placed in the lead mode, the display will be presented to the engineer. This will enable all monitoring functions. The master controller handles positions will not be active until handles are placed in the proper positions (Idle, Set, Release). A message may appear to that effect. All switching or command options will be in off or disabled mode. Also as an interlock, the forward/reverse selection on the touch panel must be made with the throttle handle 39 in the Idle position. In addition to the interlocks produced by computer determination, Brake pipe cut-off and dynamic Braking cutout may be manually determined by appropriate selection on the touch screen display 52.

Power Reduction is activated by selecting either the Local or the MU touch sensitive area. This would automatically bring the power to a 100% or maximum. The engineer then selects the proper arrow to reduce power. The power may also be increased in a like manner. The Cruise may be active by selecting the Cruise On area. The Power Reduction must be off prior to the selection of the Cruise function. This will bring the current miles per hour set speed within the Cruise window. The speed is then set by the arrows to increase or decrease. Selecting Enable will activate the Cruise control. Pushing the Enable will deactivate the control but not turn the control off. The speed setting may be changed and then the control reactivated by the Enable. Off must be selected prior to activation of the Power Reduction control.

Figure 5:
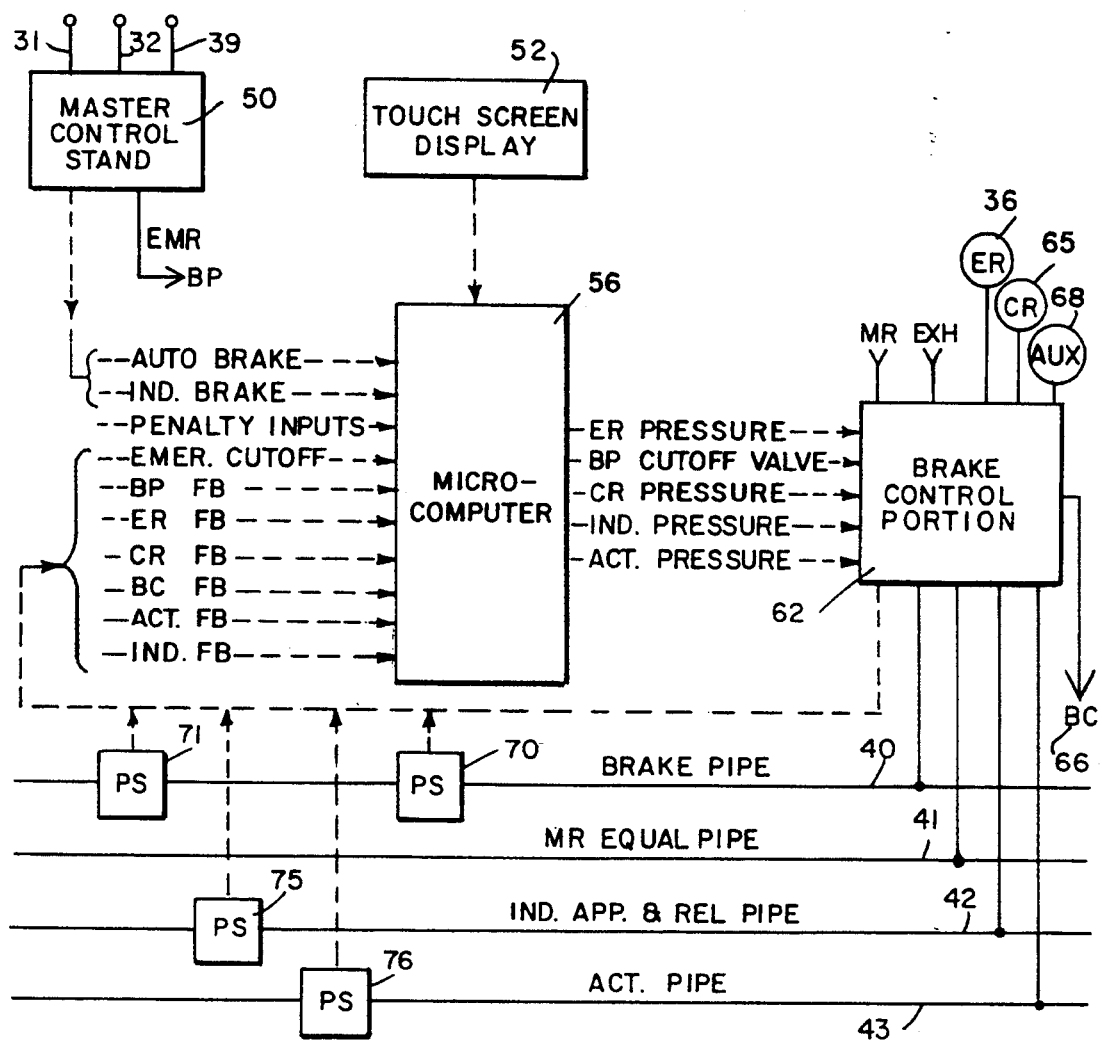
FIG. 5 is a block diagram of a computer controlled railroad locomotive brake equipment incorporating the principles of the present invention.

An overview of the brake control portion 62 of the interface control valve 60 will be described with respect to FIG. 5. The brake control portion 62 is connected to main reservoir MR, the main reservoir equalization pipe 41, and exhaust EXH as well as the equalization reservoir 36, the control reservoir 65, and the auxiliary reservoir 68 pneumatically. It also provides a pneumatic output to the brake cylinder BC, 66, the brake pipe 40, the independent application and release pipe 42 and the actuating pipe 43.

Brake control portion 62 receives electrical control signals for the equalization reservoir pressure, brake pipe cutoff valve, the control reservoir pressure, the independent application and release pipe pressure and the actuating pipe pressure from the microcomputer 56. Inputs to the microcomputer 56 includes the automatic brake and independent brake electrical signals from the master control stand 50, penalty inputs from standard penalty devices as electrical signals as well as a group of electrical feedback signals. These feedback signals from pressure sensors in FIGS. 5, 6, 7 and 8 include brake pipe pressure 70, emergency cutoff pressure 71, equalization reservoir pressure 72, control reservoir pressure 74, brake cylinder pressure 73, actuating pipe pressure 76 and independent application and release pipe pressure 75.

Figure 6:
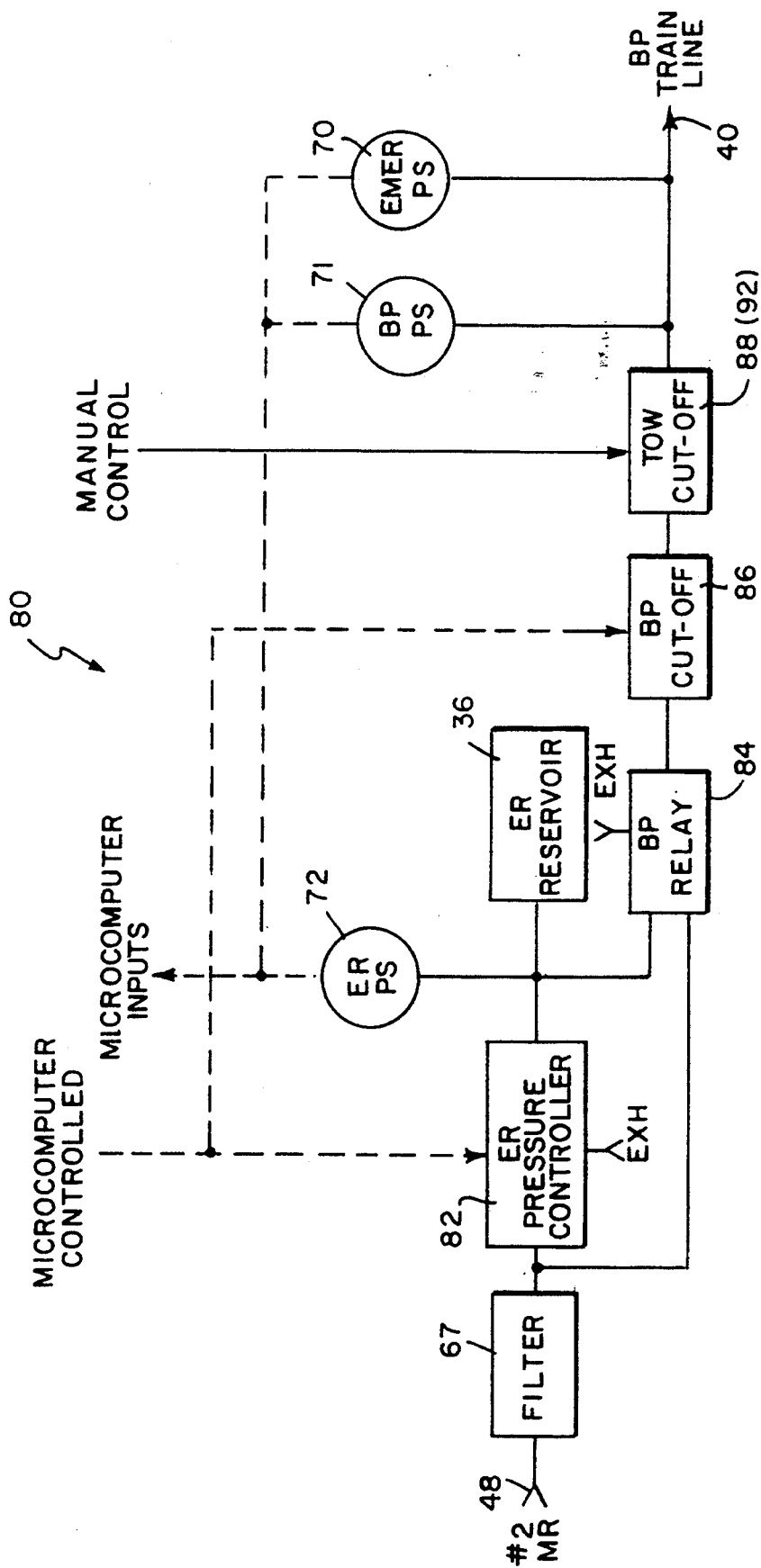
FIG. 6 is a block diagram of the brake pipe control incorporating the principles of the present invention.

The circuitry for the brake pipe control 80 of the brake control portion 62 of the interface control valve 60 is illustrated in FIG. 6. Brake pipe control 80 is connected to the second main reservoir 48 through a filter 67. Equalization reservoir 36 has its pressure controlled by the equalization reservoir pressure controller 82 under the command of the microcomputer 56. The pressure of the equalization reservoir 36 is measured by a pressure sensor 72 and fed back to the microcomputer 56. The value of the pressure in the equalization reservoir 36 is provided to the brake pipe relay 84 which will transmit a portion of the main reservoir's 48 pressure to the trainline brake pipe 40 through brake pipe cutoff 86 and tow cutoff 88. The brake pipe cutoff 86 is an electro-pneumatic device under the control of the microcomputer 56 and the tow cutoff 88 is manually controlled. Brake pipe pressure sensor 71 and emergency pressure cutoff sensor 70 are also shown in FIG. 6.

The brake pipe control 80 is active only if the locomotive is in the lead or keyed in mode. The control of the brake pipe control 80 is similar to the number 26 brake equipment in that a reference volume or equalization reservoir 36 is used. The design is fail safe in that failure of that device results in a service brake application. In the event of total failure of the microcomputer 56, a service brake reduction rate will occur.

The equalization reservoir pressure controller 82 is an electro-pneumatic device which operates to control the reference pressure within the equalization reservoir 36. The output pressure is limited to a maximum of 90 psi. Any higher pressure may be manually adjusted by means not shown. The equalization reservoir pressure controller 82 controls the pressure in the equalization reservoir 36 fully from zero psi to the maximum adjustable limit. Loss of control signal from the microcomputer 56 will result in a reduction of the equalization reservoir to zero psi at a service rate by the equalization reservoir controller 82. The engineer may set the release equalization master control stand 50.

As is well known, the brake pipe relay 84 is a pneumatic device that monitors the pressure within the equalization reservoir 36 and duplicates its pressure level to the output for the brake pipe 40. On equalization reservoir 36 pressure reduction, the brake pipe relay 84 will exhaust brake pipe 40 at a controlled service rate. The brake pipe relay 84 and the equalization reservoir pressure controller 82 are self maintaining. The brake pipe cutoff 86 is a digital electro-pneumatic device which prevents the brake pipe charging or exhaust a) when the locomotive is in the trial mode b) in the event of an emergency brake application, c) during brake pipe leakage tests as con, handed from the engineer and d) for hostling operation. The brake pipe cutoff device 86 is under the control of the microcomputer 56 and a null signal is a cut-in command. Failure of the microcomputer 56 will result in the reduction of the brake pipe 40 at a service rate thereby applying the brakes of the train.

As previously noted, the brake pipe pressure sensor 71 and the emergency cutoff pressure sensor 70 monitor the brake pipe 40. The brake pipe sensor 71 provides a signal of the actual pressure in the brake pipe 40 whereas the emergency cutoff sensor 70 need only monitor the emergency brake application. Thus the two different devices provide distinct and independent signals.

The tow cutoff device 88 is a manually operated pneumatic device. It will prevent any supply or exhaust of the brake pipe 40 for haul of the locomotive with an inoperative microcomputer 56. This devices function is integral in operation with the tow cutout 92 of the triple valve to be discussed in the brake cylinder control 90 of FIG. 7.

Figure 7:
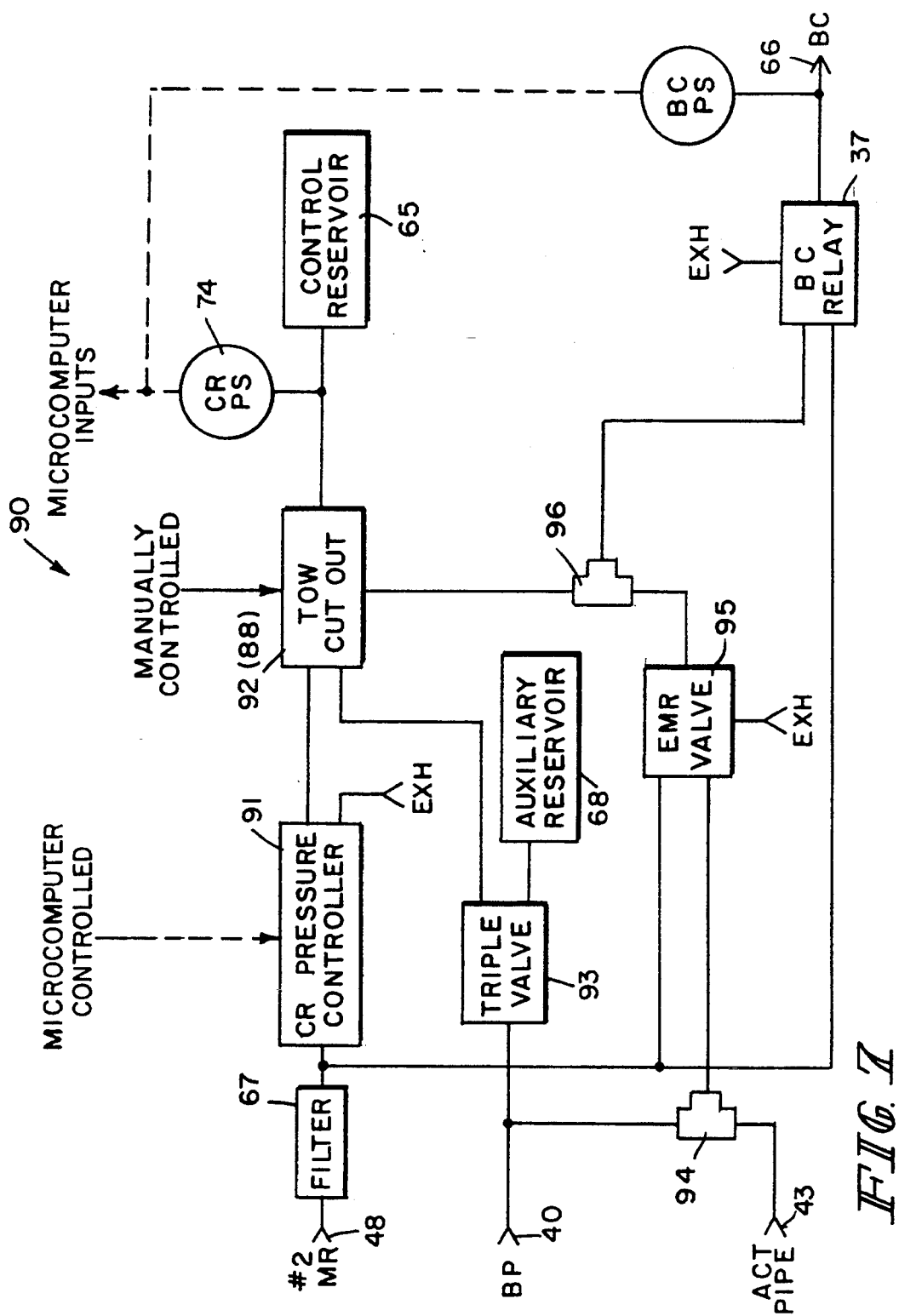
FIG. 7 is a block diagram illustrating the brake cylinder control incorporating the principles of the present invention.

The circuit for the brake cylinder control 90 of the brake control portion 62 of the interface control valve 60 is illustrated in FIG. 7 as having an input from the second main reservoir 48 through common filter 67 to the control reservoir controller 91. The control reservoir pressure controller 91, under control of computer 56, determines the pressure in control reservoir 65 which is sensed by the control reservoir pressure sensor 74 and provided as an input to the microcomputer 56. The control reservoir pressure controller 91 is connected to the control reservoir 65 through the tow cutout or switch over device 92 which is manually controlled in common with the tow cutoff device of FIG. 6. A triple valve 93 connects the brake pipe 40 and the auxiliary reservoir 68 to the tow cutoff device 82. The output of the tow cutoff device 82 is connected to the brake cylinder relay 37 through a double check valve 96. The second input to the double check valve 96 is an emergency valve 95 which receives on its controlling input the brake pipe pressure on brake pipe 40 or the pressure from the actuating pipe 43. The higher the two signals is provided by the double check valve 94 to the emergency valve 95.

The higher value of the output of the emergency valve 95 and the tow cutoff 92 is provided by the double check valve 96 to the brake cylinder relay 37 on its control input. The main reservoir 48 is the supply input to the emergency valve 95 and the brake cylinder relay 37. The output of the brake cylinder relay 37 is connected to the brake cylinder 66. The pressure of the brake cylinder 66 is measured by the brake cylinder pressure sensor 73 and provided as an input back to the microcomputer 56.

Service brake cylinder pressure is controlled solely by the microcomputer 56 under normal operating conditions. Emergency brake pressure is pneumatically controlled, circumventing any con, hand of the microcomputer 56. The tow cutout 92 in combination with the triple valve 93 provides for pneumatic control service brake for tow of a faulty locomotive.

The control reservoir pressure controller 91 is an electro-pneumatic device to control the reference pressure in the control reservoir 65. The microcomputer 56 control the output pressure electrically for command of automatic service brake level. The control is fully variable from zero psi to main reservoir pressure. Upon loss of controlling signal to the control reservoir pressure controller 91, results in a release of the pressure in the control reservoir 65 and thereby release of the locomotive brake 66. This prevents dragging of the locomotive brakes.

In the preferred embodiment, the microcomputer derives the control, for the control reservoir pressure controller 91 from sensed pipe pressure signals from the brake pipe 40, independent application and release pipe 42 and actuator pipe 43. The train braking signal on these three pipes are produced by the brake control portion 62 on this or another locomotive and the microcomputer 56 on all locomotives respond to the same pipe pressure signals at the same time. As an alternative, the microcomputer 56 could derive the controls for the control reservoir pressure controller 91 from the master stand 50 if the locomotive is in the lead mode. This is not preferred since appropriate time delays would have to be present to prevent the lead locomotive from applying its brakes before the remainder of the train.

In the event of an emergency brake signal on the brake pipe 40, the emergency valve 95 actuates pneumatically a loss of brake pipe pressure. The emergency valve 95 supplies a preset pressure output from the main reservoir 48 directly to the control port of the brake cylinder relay 37 negating any command pressure on the other input of the double acting check valve 96 from the microcomputer controlled reservoir 65. This emergency pressure output command may be removed to release the locomotive brake 66 by pressurizing the actuating pipe 43. This signal on actuating pipe 43 through double check valve 94 changes control input of emergency valve 95. The double check valve 96 also limits the output pressure from the control reservoir 65 to the emergency pressure level and prevents a malfunction of the control reservoir pressure controller 91.

On the failure of the microcomputer 56 for any cause, the triple valve 93 is included to tow the locomotive. The triple valve 93 will provide automatic service brake control pressure and is a displacement valve brake control device. To switch over from the reservoir pressure controller 91 to the triple valve 93 as a controller for the control reservoir 65 is under the control of the tow cutoff 92.

The triple valve 93 charges the auxiliary reservoir 68 at a controlled rate within the value of the brake pipe 40 pressure. When the brake pipe pressure is reduced, the triple valve 93 will move to the applied position providing auxiliary reservoir 66 pressure to the control reservoir 65. This flow will cease when the auxiliary reservoir 66 pressure has reduced to brake pipe 40 pressure. The triple valve 93 will move into the lap position. Further reduction of brake pipe will again cause the auxiliary reservoir 66 pressure to flow to the control reservoir 65 thereby increasing the brake cylinder pressure until the auxiliary reservoir 66 is reduced to the level of the brake pipe 40. In this manner, the brake may be gradually applied until equalization of the pressure of the combined volume of the auxiliary reservoir 66 and the control reservoir 65. Any further brake pipe reduction will not increase the brake cylinder's 66 pressure. Increasing the brake pipe 40 pressure will result in immediate complete release of the control reservoir 65 pressure, and thus release of the brake cylinder pressure. The triple valve 93 will have moved to the release position.

Figure 8:
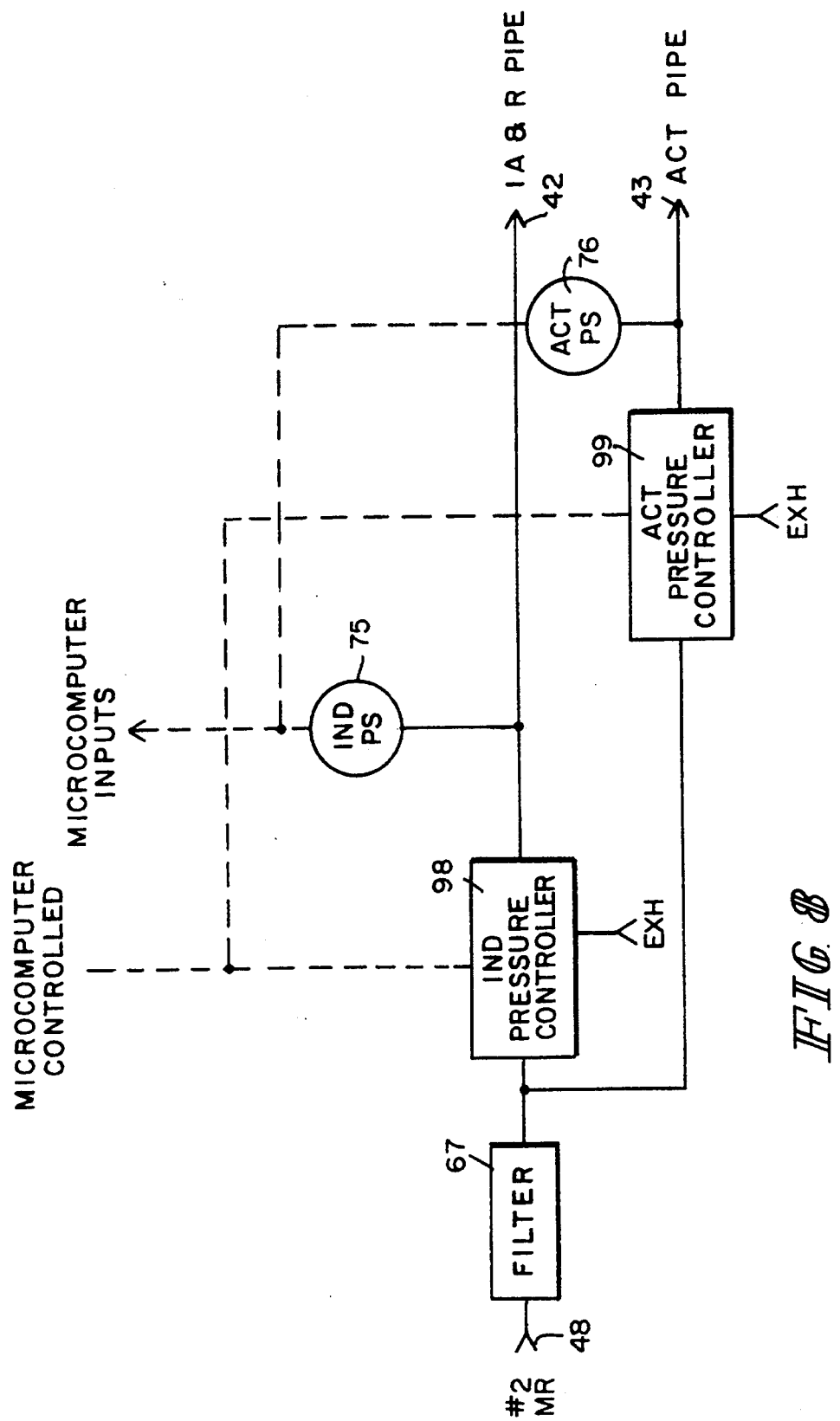
FIG. 8 is a block diagram of the independent brake control incorporating the principles of the present invention.

The independent brake control circuit of the brake control portion 62 of the interface control valve 60 is illustrated in FIG. 8. The second main reservoir 48 is connected through a common filter 67 to the independent pressure controller 98 and the actuation pressure controller 99 connected respectfully to the independent application and release pipe 42 and the actuation pipe 43. These are both electro-pneumatic devices under computer control when the locomotive is in a lead mode. Independent application and release pipe pressure sensor 75 and actuation pipe sensor 76 provides feedback signals to the microcomputer 56 which in the trailing mode provides appropriate control signal to the control reservoir pressure controller 91. Upon loss of the command signal from the microcomputer 56, the independent application and release pressure control 98 and the actuating pressure controller 99 will lap neither supplying or exhausting pressure from its respective pipes 42 and 43.

Figure 9:
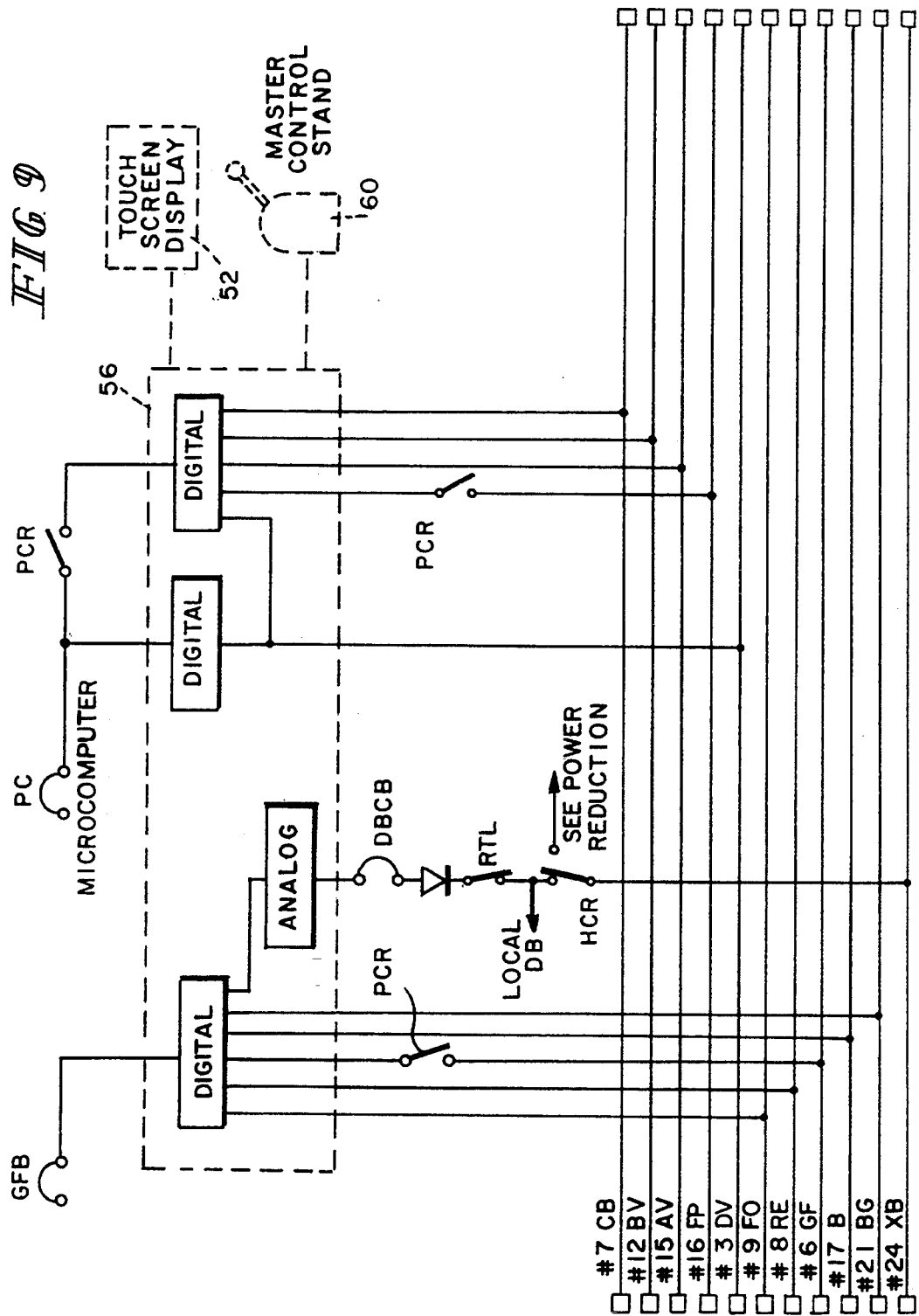
FIG. 9 is an electrical block diagram illustrating the throttle and dynamic braking control incorporating the principles of the present invention.

The microcomputer control of the throttle and dynamic braking circuits is illustrated in FIG. 9. The microcomputer 56 provides throttle and dynamic braking control through the 27-wire trainline 44. The command of the 27-wire line is controlled solely through the computer of a lead locomotive. In the trail mode, the locomotive responds normally to the 27-wire line as commanded by another locomotive. The microcomputer 56, in the trail mode, does not directly control power. The microcomputer 56 provides and replaces the cam switch interlocks with logic interlocks.

The hump control or power reduction control is an integral feature of the equipment. The engineer has a touch sensitive zone for power reduction on the display. Also the use of local or multiple unit option is provided on the touch screen 52. If local is selected, the HCR relay is only energized. If the multi-unit selection is made, then the number one trainline is energized to pick RTL relay as well as the HCR relay. The HCR relay gives control of the number 24 XB trainline to the power reduction signal. On the initial setup, the minimum reduction of power signal is given. The engineer then selects, on the touch zone display screen 52, the option of lowering or increasing the level of power reduction. The power reduction will automatically dropout when the master controller is keyed out.

Figure 10:
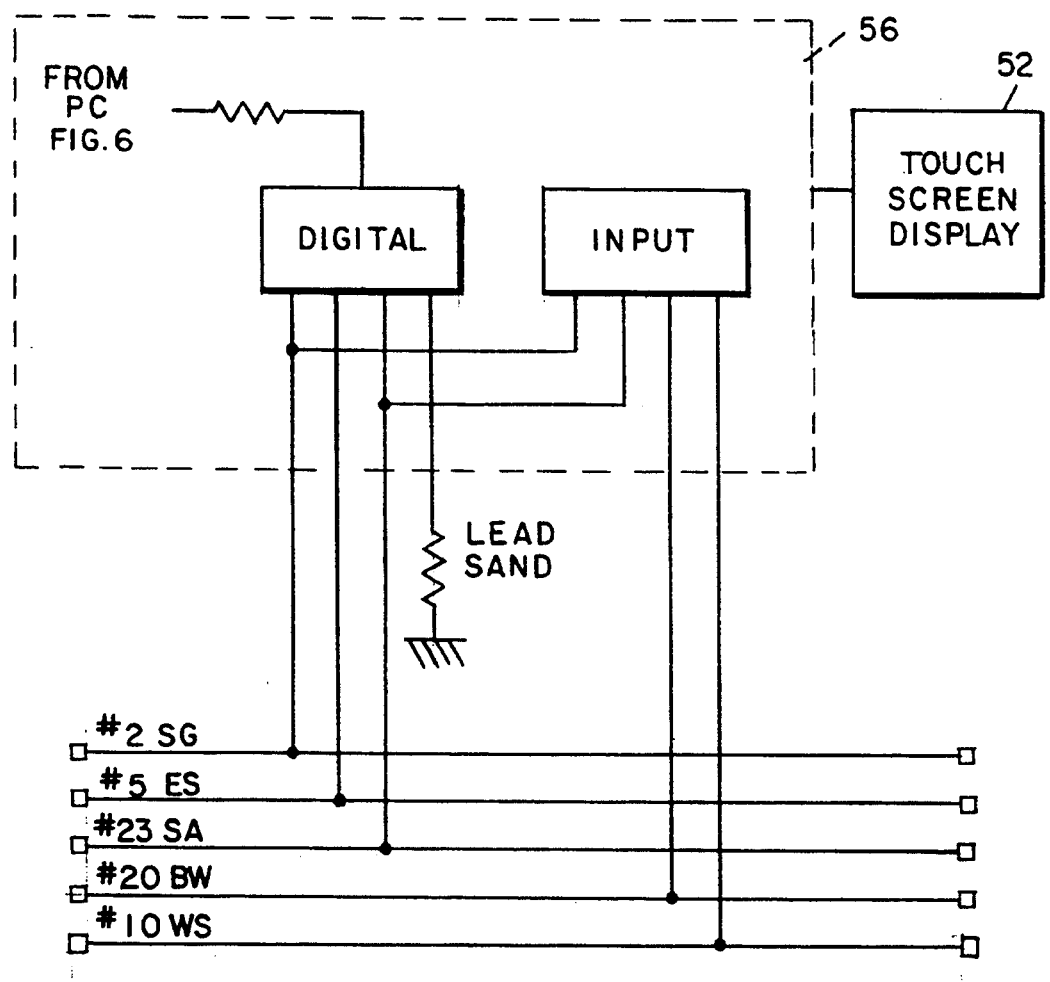
FIG. 10 is an electrical block diagram illustrating the signaling and sanding control incorporating the principles of the present invention.

FIG. 10 illustrates the interface of circuitry for the multi-unit signalling and sanding of the microcomputer 56. The microcomputer 56 will energize the bell trainline 2 through the touch sensitive zone of the display 52. The microcomputer 56 also monitors the number 2 SG trainline to provide a visional indication to the engineer. If the alarm function is held for longer than 30 seconds, a message will be shown on the display. Energizing of the emergency trainline 5ES is a function of the microcomputer 56 in the event of an emergency brake application. The signal is timed for approximately 30 seconds. The number 23 SA sanding trainline may be energized through the touch screen display 52. This trainline is monitored by the microcomputer 56 to provide a visual indication of the automatic sanding. The brake warning number 20 line is monitored by the microcomputer for a visual indication of faults. The wheelslip number 10 line is also monitored by the microcomputer for visual indication.

Figure 11:
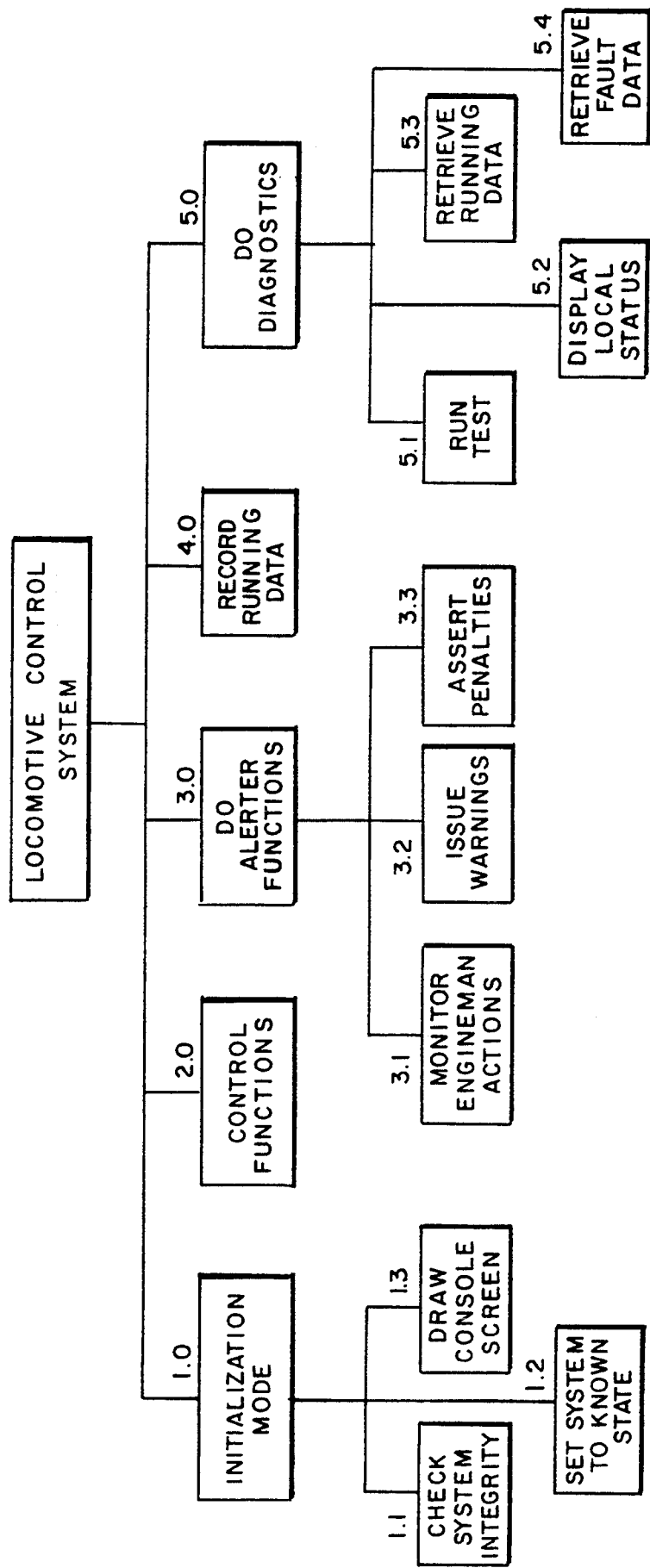
FIG. 11 is a block diagram illustrating the overall program for a locomotive control according to the present invention.
Figure 12:
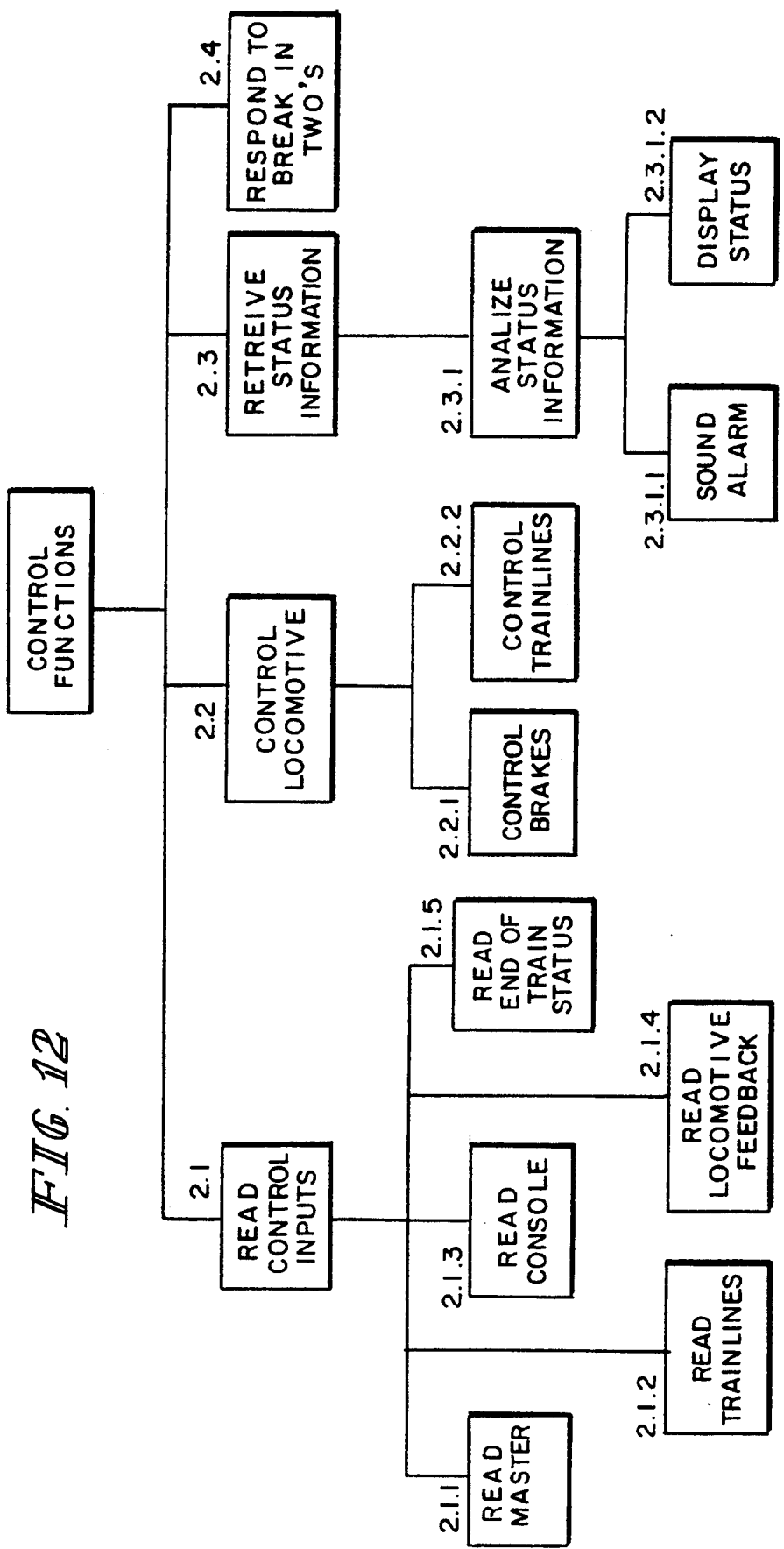
FIG. 12 is a block diagram illustrating the locomotive control portion of FIG. 11.

The hierarchy or control of the computer 56 is illustrated in FIG. 11 and 12. The locomotive control system includes the Initialization Mode 1.0, the Control Functions 2.0, the Do Alert Functions 3.0, Record Running Data 4.0 and Do Diagnostic 5.0.

The Initialization Mode 1.0 is entered when a unit is turned on. First thing a unit must do when it starts up is determine that it can function properly. Routine 1.1 checks the system integrity which includes CPU functions, the memory units as well as the timer functions. Once the system has found to operate properly, it parameters need to be initialized to values from memory and output set to known states by routine 1.2. Draw Console screen 1.3 drives the display to known states and then is drawn with the appropriate areas enabled for touch sensitivity.

The Control Functions 2.0 reads the control inputs from the enginemen, retrieves status information from locomotive equipment and trainlines, then makes decisions about how to control the train and displays the current status on the console. Read control inputs to 2.1 reads inputs from the master controller 50, touch screen display 52, the trainlines and various feedbacks. The master controller 50 is read at 2.1.1, the trainlines are read at 2.1.2, the auxiliary control console 54 is read at 2.1.3, locomotive feedback signals for example speed, motor current, and switch closures are read at 2.1.4 and end of train status is read at 2.1.5.

The Control Locomotive 2.2 determines control requirements for the locomotive based on the operator inputs and the status of the end of train. The appropriate commands for the brake equipment to control the brake pipe and brake cylinder pressure are produced by the control brake routine 2.2.1. These commands will cause the brake equipment to function like a 26L type system. Various signals are also sent to safety devices in the brake equipment. The trainline control routine 2.2.2 energizes the trainline to control the locomotive propulsion equipment.

Routine 2.3 retrieves status and information on various points of the locomotive propulsion equipment, the braking equipment and from the end of train unit. System information is analyzed at 2.3.1, alarms are sounded at 2.3.1.1 and the current status of the train is displayed at 2.3.1.2. If a break in two detected, the computer by the break in two routines 2.4 may retain the locomotive power for a very short period of time to keep the end of the train from ramming the locomotive during a stop.

The Alert Functions under 3.0 monitors the actions of the engineman to determine that he is alive and in control of train. If the engineman does not demonstrate that he is in control, appropriate warning and penalties will be issued. Routine 3.1, monitors the engineman's actions, with 3.2 providing warning signals. If the operator has not responded to the warning signals within a predescribed period of time, a penalty application will be enforced under routine 3.3.

Certain locomotive operating conditions such as handle positions, speed, and air pressure will be continuously stored in nonvolatile memory for later reference under Recording Running Data routine 4.0. Periodic diagnostic tests are run to determine operational status under routine 5.0. Specific tests to be run are run by 5.1 which includes the CPU, clock, and various memories. Current fault status is displayed by subroutine 5.2. Running data and fault data are sent to a printing device by routines 5.3 and 5.4.

Figure 13:
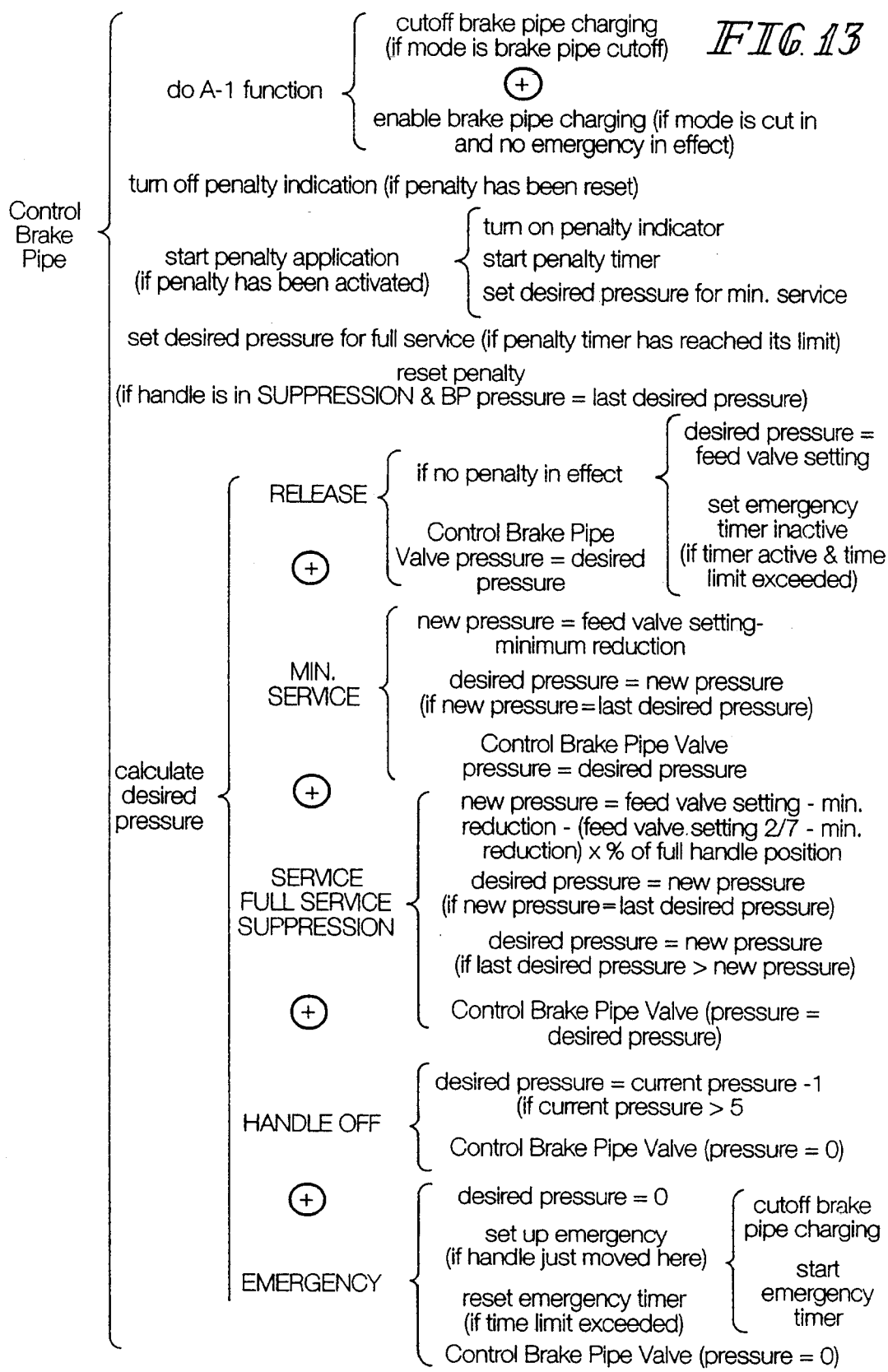
FIG. 13 is a flow chart of the control brake pipe portion of the FIG. 12.
Figure 14:
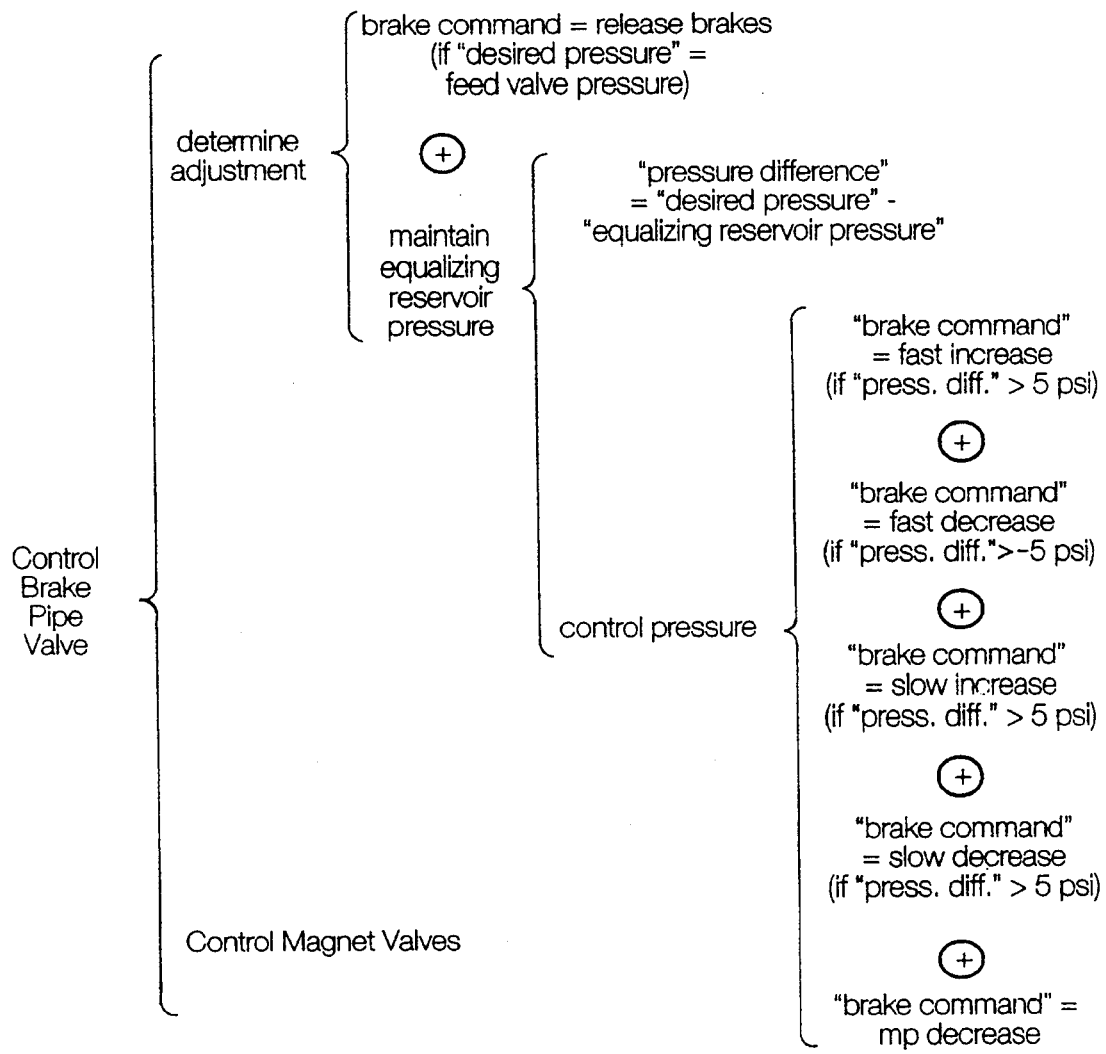
FIG. 14 is a flow chart for the control brake pipe valve portion of the program of FIG. 13.
Figure 15:
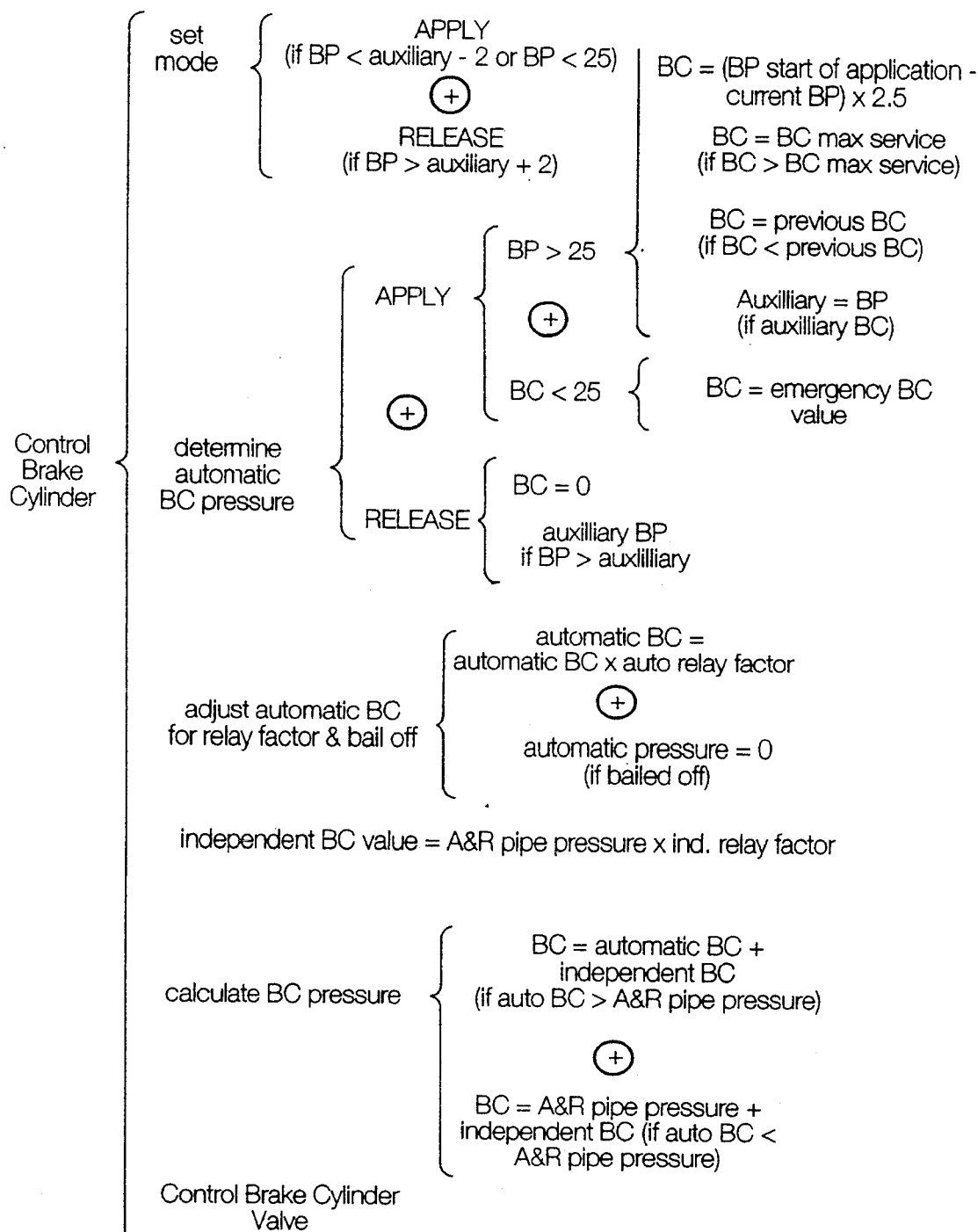
FIG. 15 is a flow chart of the control brake cylinder portion of FIG. 12.

The operation of the computer 56 to produce control functions described above are illustrated by the flow charts of FIGS. 13, 14 and 15. The control of the brake pipe is illustrated in FIG. 13. The control of the brake pipe valve is illustrated in FIG. 14. The control of the locomotive brake cylinder is illustrated in FIG. 15.

As noted from the software, the pressure for the brake pipe valve is determined as a function of the feed valve setting. This assures that an appropriate pressure is provide to apply and release brakes. This may be manually inputted to the touch display screen as a value, or to a manual preset value. Also, the model number, capacity or brand name of the relay valves also may be provided, such that an appropriate pneumatic control signal is calculated and provided from, for example, look up tables.

Microcomputer 56 between the master control stand 50 and touch screen display 52 and interface control valve 60 allows for a series of interlocks to be controlled by the computer and override signals received from the other two devices. Upon determination of an emergency braking condition from the brake pipe, the microcomputer 56 sets the propulsion control to an idle condition irrespective of the position of the propulsion handle 39. After determination of an emergency braking, the microcomputer 56 will not transmit any propulsion signals until the throttle handle has been placed in its Idle position.

As a further interlock, the microcomputer 56 will delay transmitting either propulsion signals or dynamic braking signals when the previous signal was the opposite or dynamic braking and propulsion respectively. This provides an automatic delay when switching between the propulsion and dynamic braking. When switching between forward and reverse direction, the microcomputer 56 will not transmit reverse propulsion signals until the train speed is below a predetermined speed. Also, when switching back and forth between trailing and leading modes, the microcomputer 56 will not produce any control signals until the automatic and independent braking handles 31 and 32 and the throttle 39 are in their Neutral or Idle positions. Also when switching between trailing and leading, the microcomputer 56 will not provide any signals until the locomotive speed is zero. Also previously mentioned, the microcomputer 56 will not prepare any propulsion or dynamic braking signals when it is in the trailing mode.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed:

1. A computerized locomotive control system for a locomotive having a brake pipe, independent application and release pipe, and an actuating pipe, said system comprising:
   a control stand having automatic brake and independent brake handles;
   means for applying pneumatically an emergency pressure to said brake pipe when said automatic brake handle is in an emergency position;
   means for converting positions of said handles into automatic and independent braking electrical signals; and
   computer means for controlling pressure on said brake pipe, independent application and release pipe and actuating pipe in response to said braking signals.

2. A computerized locomotive control system for a locomotive having a brake cylinder, a brake pipe and at least one of the following pipes a) main reservoir equalization pipe, b) independent application and release pipe and c) actuating pipe, said system comprising:
   input means for receiving electrical signals representing braking control signals and electrical signals representing leading and trailing modes in said locomotive;
   computer means for controlling pressure on said pipes in response to said braking control signals only in said leading mode and not in said trailing mode; and
   means for controlling said brake cylinder in response to pressure on said pipes.

3. A computerized locomotive control system for a locomotive having a brake pipe and at least one of the following pipes a) main reservoir equalization pipe, b) independent application and release pipe and c) actuating pipe, said system comprising:
   input means for receiving automatic and independent braking electrical signals; and
   computer means for controlling pressure on said pipes in response to said braking signals and controlling pressure on said brake pipe to at least a full service brake pipe pressure for absence of said automatic braking signals.

4. A computerized locomotive control system according to claim 3 wherein said computer means controls said independent application and release pipe to a brake release pressure for absence of said independent braking signals.

* * * * *